Figure 1:
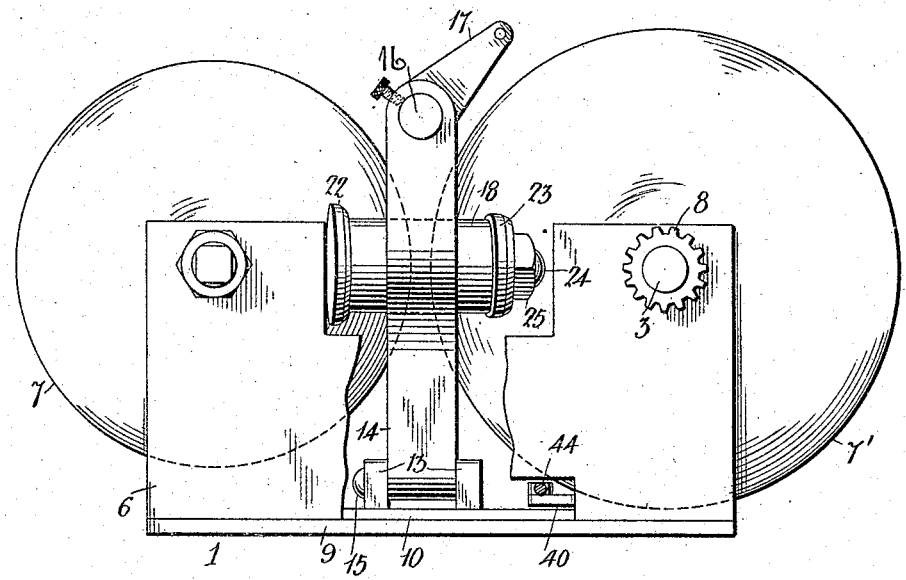

B. F. TEAL.
VARIABLE SPEED POWER TRANSMISSION MECHANISM.
APPLICATION FILED DEC. 27, 1906.

908,048.

Patented Dec. 29, 1908.

2 SHEETS—SHEET 1.

Witnesses

Inventor
B. F. Teal
by H. B. Willson & Co.
Attorneys

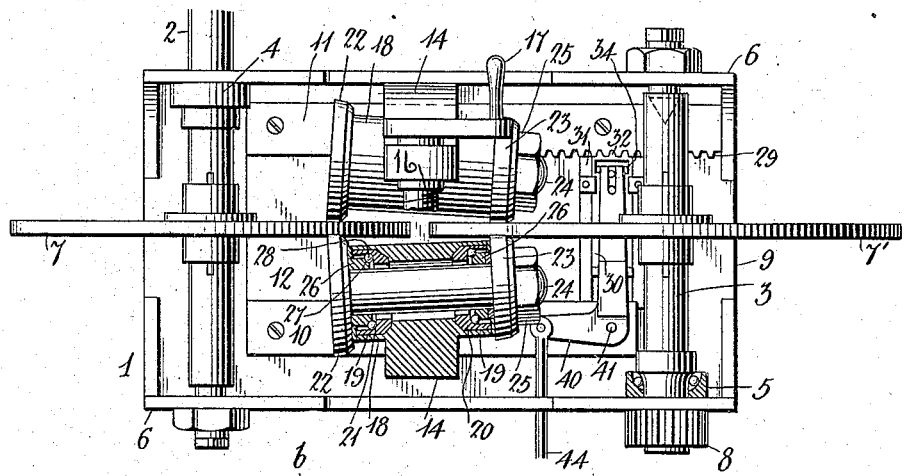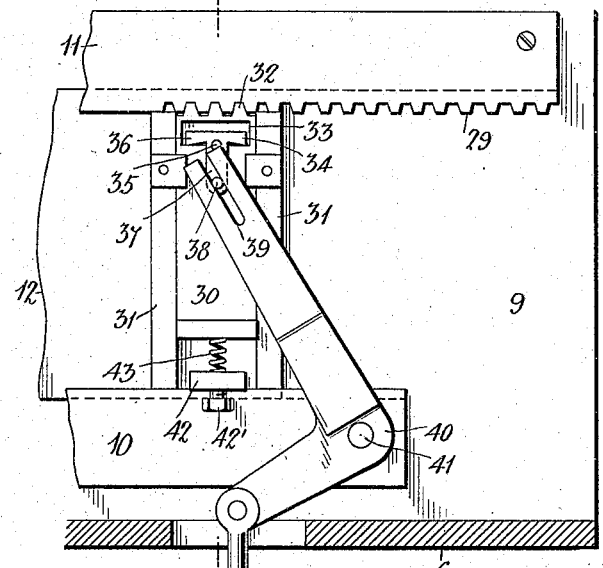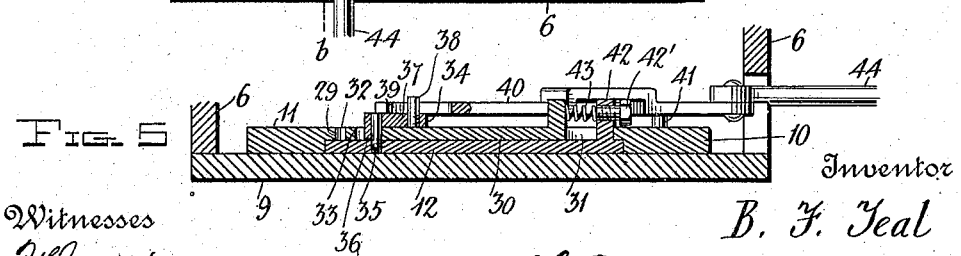

UNITED STATES PATENT OFFICE.

BENJAMIN FRANKLIN TEAL, OF GLENSIDE, PENNSYLVANIA.

VARIABLE-SPEED POWER-TRANSMISSION MECHANISM.

No. 908,048.　　　　　　Specification of Letters Patent.　　　　Patented Dec. 29, 1908.

Application filed December 27, 1906. Serial No. 349,667.

*To all whom it may concern:*

Be it known that I, BENJAMIN FRANKLIN TEAL, a citizen of the United States, residing at Glenside, in the county of Montgomery and State of Pennsylvania, have invented certain new and useful Improvements in Variable-Speed Power-Transmission Mechanism; and I do declare the following to be a full, clear, and exact description of the invention, such as will enable others skilled in the art to which it appertains to make and use the same.

My invention relates to that class of power-transmission mechanism by which variations of speed may be effected, and while it is described in the following specification, more especially as adapted for use on automobile vehicles, it is intended for general use wherever variable speed transmission is required. Heretofore, in all devices of this description, there has been a serious loss of power from the excessive friction on the working parts, especially on the journals of transmitting rolls, due to the great pressure of the rolls on the disks which is necessary to make an effective frictional drive without slippage, and this pressure is exercised equally on the roll journals, thereby so largely affecting the efficiency as to frequently render the device inoperative. As in this class of friction devices, the grip of the transmitting rolls is similar to that of a vise, it is of primary importance that the grip be firm, and practically rigid, to insure sufficient friction to prevent slippage, which will invariably occur where an elastic or yielding pressure is used. Also, in order to transmit the greatest percentage of the applied power, it is necessary to observe the rules deduced from practical experience in power transmission; and the best results are obtained through the use of a large radius of driven pulley in relation to radius of driver. Also, it is of great importance that the speed adjustment be securely retained, without the possibility of accidental shifting.

One object of my invention is to combine with the driving and driven disks, transmitting rolls, and anti-friction bearings for said rolls to relieve friction on the journals of said rolls.

A further object is to provide improved means of control in starting, stopping and varying the speed of transmission.

A further object is to provide improved means for positively moving the rolls to and from the disks, in order to start and stop the transmission.

A further object is to provide improved means for shifting the carriage which carries the transmitting rolls, to vary the speed of the driven disk, and for automatically locking the carriage itself in adjusted position.

A further object is to effect improvements in the construction and proportioning of the transmitting rolls and their relation to the driving and driven disks.

A further object is to provide means to insure perfect alinement of the two disks.

Figure 2:
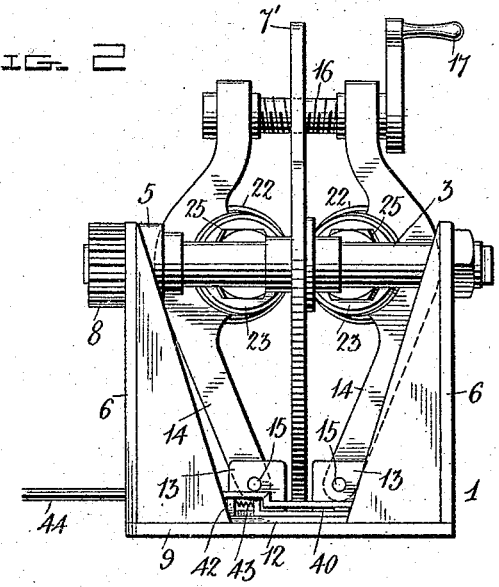

In the accompanying drawings,—Figure 1 is a side elevation of a variable speed power transmission machine embodying my improvements, with a portion of the near side of the casing removed to disclose interior mechanism; Fig. 2 is an end elevation of the same; Fig. 3 is partly a top plan view and partly a horizontal sectional view of the same, on a plane intersecting the axes of the disks and shiftable power transmitting rolls; Fig. 4 is a detail horizontal sectional view, on a larger scale, showing the controller mechanism for shifting the carriage in which the transmitting rolls are mounted and for automatically locking said carriage in any position in which the same may be placed, to prevent the carriage and transmission rolls from moving casually; and Fig. 5 is a detail transverse sectional view of the same, taken on the plane indicated by the line *b—b* of Fig. 4.

The casing 1 may be of the form here shown, or of any other suitable form. The driving shaft 2 and driven shaft 3 are mounted in ball-bearings 4, 5, in the side walls 6 thereof. On the shaft 2 is fixed a disk 7, and on the shaft 3 is fixed a disk 7', said disks being keyed to their respective shafts in a manner to allow free movement, longitudinally, on said shafts, to secure perfect alinement, and are spaced apart a suitable distance and in the same plane of rotation.

In practice, the shaft 2 and its disk 7 are driven by a suitable engine or motor, and for the purposes of this specification, I show the driven shaft 3 provided with a pinion 8 to transmit power, through a reversing gear of suitable construction, to an automobile axle shaft, or other machine element. On the upper or inner side of the bottom 9 of the casing are a pair of longitudinally-disposed, parallel guides 10, 11, which are appropriately spaced apart. Said guides have inwardly-extending flanges which bear on the top edges of a longitudinally-movable carriage 12, which travels, between said guides on the bottom of the casing. Said carriage has two pairs of jaws 13. The lower ends of a pair of arms 14, which are capable of vibratory movement toward and from each other, are pivotally mounted, as at 15, between the said pairs of jaws. The said arms are disposed on opposite sides of the common plane of the disks 7, 7', and their upper ends are connected by a right-and-left-hand screw 16, which has at one end an operating lever 17, said lever having an opening at its lower end for the reception of said screw and being secured thereto and angularly adjustable thereon, to compensate for the wear of the screw threads, so that the said operating lever may be always confined to the same arc of movement and yet secure the same "throw" or extent of movement of the arms by the screw. On the inner sides of the said arms, at a suitable distance from their upper ends, are bearing boxes 18, of cylindrical form, the axes of which are slightly oblique and converge in one direction toward the common plane of the disks. Said bearing boxes are formed with annular rabbets 19 in their ends, in which are placed bearing cups 20, the outer sides of which are provided with race grooves 21.

Two pairs of power transmitting rolls 22 are mounted in the bearing boxes and by means of the arms 14 and screw 16 may be caused to engage the sides of the disks to transmit power from the disk 7 to the disk 7'. Said pairs of rolls are conical in form to compensate for their different diameters and each consists of a larger member 22 to operate on the driving disk 7, a smaller member 23 to operate on the driven disk 7'; an axle 24 connecting them to which they are keyed, and a nut 25 screwed on the end of the axle, carrying the smaller roll to hold it firmly in position. Said roll members are provided on their inner sides with adjustable cones 26, having race grooves 27 opposed to cups of the bearing boxes 18, and coacting therewith to form annular races for bearing balls 28.

It will be understood that when the transmitting rolls are applied to the disks, they serve to transmit power from the driving disk to the driven disk, and that the speed of the latter may be varied at will, without varying the speed of the driving disk, by moving the transmitting rolls radially on the disks, so that, as they recede from the center of one they approach the center of the other. The transmitting rolls are thus moved by shifting the carriage by the controller mechanism hereinafter described. The action of the screw which connects the arms that carry the rolls is positive and effective in moving the rolls in either direction with respect to the common plane of the disks, but I do not confine myself to the use of a screw, as any suitable device, such as a toggle, will accomplish the purpose. By the provision of the anti-friction bearings for the transmitting rolls, the coefficient of friction on the journals of said rolls is reduced to a minimum, and the friction between the rolls and the disks may be increased by the action of the arms and screw without appreciably adding to the load on the driving disk. By making the connecting rolls conical, the smaller members 23 of the rolls are adapted to bear properly upon and for operating the driven disk 7' and at the same time, permitting the employment of disks of the same thickness. Also, the speed of rotation of the driven disk is properly reduced as compared with the driving disk, and this without having to make the driven disk of unnecessarily large diameter. This is quite an important feature of the invention, in that it permits of the device being made in more compact form.

I will now describe my improved controller mechanism for shifting the carriage which carries the transmission rolls and, automatically, securely locking the said carriage in any position to which it may be adjusted.

The flange of the guide 11 is provided for a suitable distance from one end with rack teeth 29. A slide 30 is movable transversely on the carriage in guides 31 and is provided at one end with rack teeth 32 to engage and disengage with the rack teeth 29. Said slide is provided near its engaging end with a rectangular recess 33. A T-shaped dog 34 is pivotally mounted, as at 35, on the carriage. The arms 36 of said dog are disposed in the recess 33, and the arm 37 of the dog has a projecting pin 38, which operates in a slot 39 in the long arm of a bell-crank 40, which is fulcrumed, as at 41, on the guide 10 of the casing. On the carriage 12 is a lug 42, in which operates an adjusting screw 42'. A spring 43 bears between said screw and the outer end of the slide 30, to engage the teeth of the latter with certain of the teeth of the guide 11, and to also engage one side of the recess 33 in the slide with the arms 36 of the dog and cause the arm 37 thereof to lie parallel with the slide. A controlling rod 44 is pivotally connected to the short arm of the bell crank, and led to any desired position.

The bell crank may be turned in either direction by means of the controller rod. The initial movement of the bell crank, causes the dog, which is in effect a link between the bell crank and the slide, to partly turn, so that one of its arms 36 will engage one side of the recess 33 and move the slide, against the pressure of the spring 43, out of engagement with the rack on the guide 11, and continued movement of the bell crank in the same direction will cause the slide and hence also the carriage to which it is connected, to move longitudinally and hence shift the transmitting rolls on the disks. As soon as the controller rod is released, the spring 43 will reëngage the teeth of the slide with certain of the teeth of the guide 11, and thereby lock the carriage in its adjusted position and against casual movement.

From the foregoing description, taken in connection with the accompanying drawings, the construction and operation of the invention will be readily understood without requiring a more extended explanation.

Various changes in the form, proportion, and the minor details of construction may be resorted to without departing from the principle, or sacrificing any of the advantages of the invention, as defined by the appended claims.

Having thus described my invention, what I claim as new, and desire to secure by Letters-Patent, is,—

1. In a variable speed power transmission mechanism, a casing having a toothed rack, a carriage arranged for sliding movement in the casing, a locking slide movably mounted on the carriage and formed for engagement with the rack to lock the carriage against movement, means for moving the slide automatically to locking position, and means adapted by its continuous movement to both release the slide and to move the carriage.

2. In a variable speed power transmission mechanism, a casing having horizontal guides, one of said guides being provided with a rack, a carriage movably arranged in the casing and engaged with said guides, a locking slide movably sustained on the carriage and formed for engagement with said rack, means for moving the slide automatically to locking position, and means for moving the slide to releasing position.

3. In variable speed power transmission mechanism, the combination of a casing, driving and driven disks having their shaft bearings therein, a carriage movable on the casing, opposed transmitting rolls, carried by the carriage to engage said disks, a locking element movable on and also with the carriage, a spring to normally move said element to locking position, a bell crank pivotally mounted on the casing, and a movable link element connecting the bell-crank to the locking element, to move the latter to unlocking position.

4. In variable speed power transmission mechanism, the combination of a casing, a fixed rack therein, driving and driven disks having their shaft bearings in the casing, a carriage movable on the casing, opposed transmitting rolls, carried by the carriage, to engage said disks, a locking element movable on and also with the carriage, and having one or more rack teeth to engage the rack of the casing, a spring to normally move said element to locking position, a bell-crank pivotally mounted on the casing, and a movable link element connecting the bell-crank to the slide and operated by the former to move the latter to unlocking position against the pressure of the spring.

5. In variable speed power transmission mechanism, the combination of driving and driven disks, transmitting rolls pivotally mounted laterally, movable elements having bearings for the rolls, a right-and-left-hand screw engaging and connecting said movable elements to positively move said rolls to and from the disks, and an operating lever for said screw adjustably secured thereto.

6. In variable speed power transmission mechanism, the combination of driving and driven disks, and opposed conical transmitting rolls connecting them and having their apex oblique to the common plane of the disks, each of said rolls having a larger member to engage the driving disk and a smaller member to engage the driven disk.

7. In variable speed power transmission mechanism, the combination of a driving and a driven disk, with their respective shafts, said disks being keyed to said shafts and freely movable, longitudinally thereon, two pairs of opposed transmitting rolls of different diameters, and means for moving said rolls to engaging and disengaging positions, and means for adjusting the position of said rolls between the centers of said disks, and automatically locking them in the adjusted position.

8. In variable speed power transmission mechanism, the combination of driving and driven disks, transmitting rolls to rigidly engage said disks, a carriage for said rolls, and means to shift said carriage and lock the carriage itself when adjusted, against casual movement.

9. In variable speed power transmission mechanism, the combination of driving and driven disks, transmitting rolls to rigidly engage said disks, a carriage for said rolls, means to shift said carriage, and means coacting with said carriage shifting means, to lock the carriage, when adjusted, against casual movement.

In testimony whereof I have hereunto set my hand in presence of two subscribing witnesses.

BENJAMIN FRANKLIN TEAL.

Witnesses:
JOSEPH J. LAWLESS,
MAMIE E. TATHAM.